United States Patent [19]

Kovacs

[11] Patent Number: 5,696,713
[45] Date of Patent: Dec. 9, 1997

[54] METHOD FOR FASTER DIVISION BY KNOWN DIVISOR WHILE MAINTAINING DESIRED ACCURACY

[75] Inventor: Linda Anne Kovacs, Maine, N.Y.

[73] Assignee: International Business Machines Corporation, Armonk, N.Y.

[21] Appl. No.: 515,082

[22] Filed: Aug. 21, 1995

[51] Int. Cl.$^6$ ............................................... G06F 7/52
[52] U.S. Cl. .................................................. 364/764
[58] Field of Search ............................. 364/764, 761, 364/766, 767

[56] References Cited

U.S. PATENT DOCUMENTS

| 5,001,664 | 3/1991 | Makita et al. | 364/761 |
| 5,140,545 | 8/1992 | Vassiliadis et al. | 364/765 |
| 5,206,827 | 4/1993 | Tsuruta | 364/767 |
| 5,249,149 | 9/1993 | Cocanougher et al. | 364/748 |
| 5,311,460 | 5/1994 | Herschfelt | 364/761 |
| 5,315,540 | 5/1994 | Lawless | 364/764 |
| 5,339,267 | 8/1994 | Ito | 364/761 |
| 5,386,376 | 1/1995 | Girard et al. | 364/767 |
| 5,402,369 | 3/1995 | Main | 364/757 |

*Primary Examiner*—David M. Malzahn
*Attorney, Agent, or Firm*—Eugene I. Shkurko; Richard M. Goldman

[57] ABSTRACT

A method for determining a combination of shift operations whose results, when added, or added and subtracted in combination, give any desired accuracy for integer division by a known integer divisor.

6 Claims, 2 Drawing Sheets

```
101  COMPARAND = INVERSE OF DIVISOR
102  RESULT = INVERSE OF SMALLEST POWER OF 2 LARGER THAN DIVISOR
103  IF RESULT IS WITHIN DESIRED ACCURACY, GOTO 110
104  LOOP
105    OLD RESULT = RESULT
106    RESULT = RESULT + INVERSE OF NEXT LARGER POWER OF 2
107    IF RESULT IS WITHIN DESIRED ACCURACY THEN GOTO 110
108    ELSE IF (RESULT > COMPARAND) THEN RESULT = OLD RESULT
109  END LOOP
110  GENERATE A SHIFT OPERATION FROM EACH TERM OF RESULT
111  ADD OUTPUT OF ALL SHIFT OPERATIONS, IF MORE THAN ONE
```

PSEUDOCODE IMPLEMENTATION OF SHIFT AND ADD

101 COMPARAND = INVERSE OF DIVISOR
102 RESULT = INVERSE OF SMALLEST POWER OF 2 LARGER THAN DIVISOR
103 IF RESULT IS WITHIN DESIRED ACCURACY, GOTO 110
104 LOOP
105 OLD RESULT = RESULT
106 RESULT = RESULT + INVERSE OF NEXT LARGER POWER OF 2
107 IF RESULT IS WITHIN DESIRED ACCURACY THEN GOTO 110
108 ELSE IF (RESULT > COMPARAND) THEN RESULT = OLD RESULT
109 END LOOP
110 GENERATE A SHIFT OPERATION FROM EACH TERM OF RESULT
111 ADD OUTPUT OF ALL SHIFT OPERATIONS, IF MORE THAN ONE

PSEUDOCODE IMPLEMENTATION OF SHIFT AND ADD

FIG. 1

```
201  COMPARAND = INVERSE OF DIVISOR
202  RESULT = INVERSE OF POWER OF 2 CLOSEST TO DIVISOR
203  IF RESULT IS WITHIN DESIRED ACCURACY, GOTO 218
204  LOOP
205    OLD RESULT = RESULT
206    IF (RESULT < COMPARAND) THEN
207      RESULT = RESULT + INVERSE OF NEXT LARGER POWER OF 2
208    ELSE RESULT = RESULT - INVERSE OF NEXT LARGER POWER OF 2
209    IF RESULT IS WITHIN DESIRED ACCURACY THEN GOTO 213
210    ELSE IF (RESULT/COMPARAND) IS LESS ACCURATE THAN (OLD RESULT/COMPARAND) THEN
211      RESULT = OLD RESULT
212  END LOOP
213  DO FOR EACH TERM IN RESULT EXCEPT LAST
214    IF (DENOMINATOR OF NEXT TERM IS TWICE THE DENOMINATOR OF THIS TERM) AND
215       (SIGNS OF TERMS ARE OPPOSITE) THEN
216      REPLACE BOTH TERMS BY ONE WITH THE SIGN OF THE FIRST AND THE VALUE OF
            THE SECOND
217  END DO FOR
218  GENERATE A SHIFT OPERATION FROM EACH TERM OF RESULT
219  ADD OR SUBTRACT OUTPUT OF SHIFT OPERATIONS AS REQUIRED
```

PSEUDOCODE IMPLEMENTATION OF SHIFT AND ADD/SUBTRACT

FIG. 2

METHOD FOR FASTER DIVISION BY KNOWN DIVISOR WHILE MAINTAINING DESIRED ACCURACY

BACKGROUND OF THE INVENTION

1. Technical Field of the Invention

This invention pertains to performing division operations on a processor. In particular, this invention reduces the number of machine cycles required for a division operation, thereby providing a more efficient use of processor time.

2. Background Art

On most computers, division is a slow operation, taking many machine cycles. On a typical microprocessor, division of a number less than 65,536 by another number less than 65,536 takes approximately 50 machine cycles. If either of the numbers is larger than 65,536, the division operation takes over 100 cycles (in fact, on some older microprocessors, the division operation can take more than 2000 machine cycles). Because of this, most programmers, when they need to divide an integer by a power of 2 (4, 8, 16, etc.) use a shift operation, which takes only 3 cycles, instead. For example, shifting the number right 5 bits is equivalent to dividing it by 32 (25); shifting right 8 bits is equivalent to dividing by 256 (28). However, this substitution of a shift operation for a division operation is accurate only when dividing by a power of 2.

Conversion of one measurement unit to another, larger unit requires division by a conversion factor, which is seldom a power of two. For example, if a programmer specifies a time interval in a program in units of microseconds, but the machine on which the program must run can generate time ticks only at 100 microsecond intervals, the programmer's specification must be divided by 100 to make the conversion. Such conversions always use integer division, with a known divisor. Integer division is a division operation in which both divisor and dividend are integers, and any remainder is discarded.

If the program is also performance-sensitive, real division should not be used if possible, as it simply takes too long. However, the substitution of a shift operation for a division operation is not accurate for conversion factors which are not powers of 2. For instance, the power of 2 that is nearest to 100 is 128, or 2**7. The substitution of a right shift of 7 bits for division by 100 yields a quotient that is over 20% too small.

SUMMARY OF THE INVENTION

This invention is a method, programmable for use on a computer, for determining a combination of shift operations whose results, when added or subtracted, give any desired accuracy for integer division by a known integer divisor.

A small number of shift operations and add or subtract operations is substantially faster than a division operation, even for short numbers. For instance, using the example above, if the user specified a time interval of 5 seconds (5,000,000 microseconds), the conversion to 100-microsecond intervals (50,000 intervals) is performed by dividing by 100. If this is done by using the division operation, it takes over 100 machine cycles on a typical microprocessor. By using the shift and add method, it takes 3 shifts and 2 adds, for a total of 9 machine cycles on the same microprocessor, and this generates a result that is accurate to 99%.

This invention presents methods to be used by a programmer to determine, or to develop a program to determine, a minimum set of operations to generate a quotient from any known integer divisor, by using the fast shift operations instead of the slow division operations. The methods can be tuned to provide any required degree of accuracy, limited by the word size on the computer (that is, if the size of an integer on a particular computer is 32 bits, the largest meaningful shift operation is 31 bits. If the divisor is very large, there may not be enough shift operations available to reach the specified accuracy). The minimum set of operations can then be repeatedly carried out in hardware using memory storage locations such as shift registers, for example, to quickly implement the programmed method.

Other features and advantages of this invention will become apparent from the following detailed description of the presently preferred embodiment of the invention, taken in conjunction with the accompanying drawings.

BRIEF DESCRIPTION OF THE DRAWING

FIG. 1 illustrates the Shift and Add method.

FIG. 2 illustrates the Shift and Add/Subtract method.

BEST MODE FOR CARRYING OUT THE INVENTION

There are two similar methods to work out the desired combination of shift operations. Which method to use depends on whether the closest power of 2 is larger or smaller than the integer divisor.

Shift and Add Method

For the easier method, start with the inverse of the closest power of 2 that is larger than the integer divisor and add the inverse of the next larger power of 2. If the result is within the required accuracy, stop. Otherwise, if the result is larger than the exact result, discard that term. Add the inverse of the next larger power of 2 and repeat the accuracy test. After determining the desired terms, convert each inverse to be used into a shift operation, and add the results together.

The pseudocode of FIG. 1 produces a program fragment which produces a result as close as required to an actual division operation. Lines 101 and 102 set up ("initialize") the Comparand, which is an inverse of the real divisor, and the Result, which is the approximation of the inverse of the real divisor. Line 103 tests this initial Result to determine whether it is accurate enough. If it is, the loop in lines 104–109 is skipped, and the program fragment is generated from the single term. The loop in lines 104–109 produces successive approximations of the quotient. Line 105 saves the previous Result in case the term to be added is too large. Line 106 adds the next term. If Result is accurate enough, Line 107 leaves the loop and goes on to generate the program fragment. Otherwise, Line 108 discards the most recently added term if Result has become larger than the target quotient. Lines 110 and 111 generate the program fragment which replaces the division operation.

Shift and Add/Subtract Method

Although the above method will work for all divisors, it may not generate a program fragment with a minimal number of terms. If the closest power of 2 is smaller than the integer divisor, a combination with fewer terms may result by beginning with the inverse of the power of 2 that is closest to the integer divisor, then adding or subtracting successive powers of 2, depending on whether the previous result was too large or too small. If the result is within the required accuracy, stop. Otherwise, if the result is less accurate than the previous result, discard that term. Add or subtract the inverse of the next larger power of 2 and repeat the accuracy test. Once the result is accurate enough, the number of terms may be reduced by recognizing that [+(1/n)−(1/2n)] is equivalent to [+(1/2n)], and [−(1/n)+(1/2n)] is equivalent to [−(1/2n)]. After determining the desired terms, convert each inverse to be used into a shift operation, and add or subtract the results as required.

The pseudocode of FIG. 2 produces a program fragment which produces a result as close as required to an actual division operation, and has the minimum number of terms. Lines 201 and 202 set up ("initialize") the Comparand, which is an inverse of the real divisor, and the Result, which is the approximation of the inverse of the real divisor. Line 203 tests this initial Result to determine whether it is accurate enough. If it is, the program fragment is generated from the single term. The loop in lines 204–212 produces successive approximations of the quotient. Line 205 saves the previous Result in case the term to be added is too large. Lines 206–208 add or subtract the next term. If Result is accurate enough, Line 209 leaves the loop and goes on to generate the program fragment. Otherwise, Lines 210–211 discards the most recently added term if Result has become less accurate than the previous Result. Lines 213–217 reduce the number of terms in the result, if possible. Lines 218 and 219 generate the program fragment which replaces the division operation.

Using either of the methods shown, the programmer may produce a program fragment which produces a result as close as desired to an actual division operation, without the performance overhead of doing division.

EXAMPLES OF OPERATION

Shift and Add Method

To divide by 100 with accuracy of better than 99%:

Start with the inverse of the nearest power of 2 that's larger than the divisor, 128

(1/128) is 28% too small

Add the inverse of the next larger power of 2, 256

(1/128)+(1/256)=(3/256), approximately (1/85), 15% too big

Because the result is too big, don't use 1/256

Add the inverse of the next larger power of 2, 512

(1/128)+(1/512)=5/512, approximately (1/102), 2% too small

The result is too small, so do use 1/512

Add the inverse of the next larger power of 2, 1024

(1/128)+(1/512)+(1/1024)=(11/1024), approximately (1/93), 7% too big

Because the result is too big, don't use 1/1024

Add the inverse of the next larger power of 2, 2048

(1/128)+(1/512)+(1/2048)=(21/2048), approximately (1/97), 3% too big

Because the result is too big, don't use 1/2048

Add the inverse of the next larger power of 2, 4096

(1/128)+(1/512)+(1/4096)=(41/4096), approximately (1/99.9), slightly too large and within the required accuracy of 99%

So, a way to quickly divide a number N by 100 is (N/128)+(N/512)+(N/4096), or (N/2\*\*7)+(N/2\*\*9)+(N/2\*\*12). The program fragment would then be (N shifted right 7 bits)+(N shifted right 9 bits)+(N shifted right 12 bits).

Using this program with N=5,000,000 produces an approximated quotient of 50,047, which is 100.1% of (5,000,000/100).

Shift and Add/Subtract Method

To divide by 100 with accuracy of better than 99%:

Start with the inverse of the power of 2 that's closest to the divisor, 128

1/128 is 28% too small

The previous result is too small, so add the inverse of the next larger power of 2, 256

(1/128)+(1/256)=(3/256), approximately (1/85), 15% too large

The result is more accurate than the previous result, so use +(1/256)

The previous result is too large, so subtract the inverse of the next larger power of 2,512

(1/128)+(1/256)−(1/512)=(5/512), approximately (1/102), 2% too small

The result is more accurate than the previous result, so use +(1/512)

The previous result is too small, so add the inverse of the next larger power of 2, 1024

(1/128)+(1/256)−(1/512)+(1/1024)=(11/1024), approximately (1/93), 7% too large

The result is less accurate than the previous result, so don't use +(1/1024)

The previous result is too small, so add the inverse of the next larger power of 2, 2048

(1/128)+(1/256)−(1/512)+(1/2048)=(21/2048), approximately (1/97), 3% too large

The result is less accurate than the previous result, so don't use +(1/2048)

The previous result is too small, so add the inverse of the next larger power of 2, 4096

(1/128)+(1/256)−(1/512)+(1/4096)=(41/4096), approximately (1/99.9), within the required accuracy of 99%.

Reduce terms:

+(1/128)+(1/256): no reduction (signs the same)+(1/256)−(1/512)= +(1/512)

Result is now+(1/128)+(1/512)+(1/4096)+(1/512)+(1/4096): no reduction (denominators too far apart)

So a way to quickly divide a number N by 100 is (N/128)+(N/512)+(N/4096), or (N/2\*\*7)+(N/2\*\*9) +(N/2\*\*12). The program fragment would then be (N shifted right 7 bits)+(N shifted right 9 bits)+(N shifted right 12 bits).

Using this program with N=5,000,000 produces an approximated quotient of 50,047, which is 100.1% of (5,000,000/100).

Notes on the Methods

In this case (dividing by 100), both methods produced the same set of shift and add operations. In other cases, the results for the two methods might be different. For instance, when dividing by 10,000, the first method produces a program fragment of (N shifted right 14 bits)+(N shifted right 15 bits)+(N shifted right 17 bits)

with a resulting approximated quotient when N is 5,000,000 of 495 (99% of 5,000,000/10,000). However, the second method produces a program fragment of (N shifted right 13 bits)+(N shifted right 16 bits)+(N shifted right 17 bits)

with a resulting approximated quotient of 496 (99.2% of 5,000,000/10,000). The difference in the approximated quotients resulting from these two methods is due to the fact that the methods shifted out (discarded) different numbers of bits. This is acceptable, as the accuracy specified was only 99%.

Alternative Embodiments

It will be appreciated that, although specific embodiments of the invention have been described herein for purposes of illustration, various modifications may be made without departing from the spirit and scope of the invention. In particular, these methods may be implemented as methods for compilers or other code-generation programs, which could then generate a faster substitute for integer division for performance-sensitive programs, where the divisor is a known quantity. If used in this way, the resulting executable code will contain the more efficient shift and add or subtract operations rather than the less efficient division operation.

If (referring to FIG. 1) the test in line 108 is performed before the test in line 107, it ensures that the approximated quotient can never be larger than the actual quotient, if that quality is desired. With this reversal, the test in line 107 should not be performed if line 108 discards the term.

If it is desired that the approximated quotient can never be smaller than the actual quotient, the method shown in FIG. 1 can be modified so that Line 102 uses the largest power of 2 that's smaller than the divisor, line 106 subtracts the next larger power of 2, and line 108 (performed before the test in line 107) discards the current term and skips the test in line 107 if Result <Comparand.

Accordingly, the scope of protection of this invention is limited only by the following claims and their equivalents.

We claim:

1. A method for dividing a dividend by a known divisor comprising the steps of:
    (a) determining an inverse of a smallest power of 2 that is larger than or equal to the known divisor to form a preliminary divisor, including storing a base 2 exponent of the smallest power of 2;
    (b) determining an inverse of a next largest power of 2;
    (c) adding the inverse of the next largest power of 2 to a cumulative divisor if a sum of the inverse of the next largest power of 2 and the cumulative divisor is less than an inverse of the known divisor, said cumulative divisor equal to a sum of the preliminary divisor and any previously determined inverses of a next largest power of 2 that were added to the cumulative divisor;
    (d) storing a base 2 exponent of the next largest power of 2 if its inverse was added to the cumulative divisor in step (c);
    (e) repeating steps (b) through (d) until a difference between the cumulative divisor and the inverse of the known divisor is within a preselected margin of error;
    (f) storing the dividend in a register;
    (g) right shifting the dividend N bits to form a cumulative quotient including storing the cumulative quotient, where N is equal to the base 2 exponent of the smallest power of 2 that is larger than or equal to the known divisor;
    (h) restoring the dividend in the register and right shifting the restored dividend M bits including adding a result of shifting the restored dividend to the cumulative quotient, where M is a base 2 exponent of a power of 2 stored in step (d); and
    (i) repeating step (h) for each base 2 exponent of a power of 2 stored in step (d).

2. A method for dividing a dividend by a known divisor comprising the steps of:
    (a) determining an inverse of a power of 2 that is closest to the known divisor to form a preliminary divisor, including storing a base 2 exponent of the power of 2;
    (b) determining an inverse of a next largest power of 2;
    (c) either adding the inverse of the next largest power of 2 to a cumulative divisor if both the following conditions are met:
        i) the cumulative divisor is smaller than an inverse of the known divisor, and
        ii) a sum of the inverse of the next largest power of 2 and the cumulative divisor is closer to the inverse of the known divisor than the cumulative divisor,
    or
    subtracting the inverse of the next largest power of 2 from the cumulative divisor if both the following conditions are met:
        i) the cumulative divisor is greater than the inverse of the known divisor, and
        ii) a total of the inverse of the next largest power of 2 subtracted from the cumulative divisor is closer to the inverse of the known divisor than the cumulative divisor,
    said cumulative divisor equal to a total of the preliminary divisor and any previously determined inverses of a next largest power of 2 that were added to or subtracted from the cumulative divisor;
    (d) storing a base 2 exponent of the next largest power of 2 if its inverse was added to or subtracted from the cumulative divisor in step (c);
    (e) repeating steps (b) through (d) until a difference between the cumulative divisor and the inverse of the known divisor is within a preselected margin of error;
    (f) storing the dividend in a register;
    (g) right shifting the dividend N bits to form a cumulative quotient including storing the cumulative quotient, where N is equal to the base 2 exponent of the smallest power of 2 that is closest to the known divisor;
    (h) restoring the dividend in the register and right shifting the restored dividend M bits including either:
        adding a result of shifting the restored dividend to the cumulative quotient if the corresponding inverse of the power of 2 was added to the cumulative divisor in step (c), or
        subtracting a result of shifting the restored dividend from the cumulative quotient if the corresponding inverse of the power of 2 was subtracted from the cumulative divisor in step (c),
    where M is a base 2 exponent of a power of 2 stored in step (d); and
    (i) repeating step (h) for each power of 2 stored in step (d).

3. A program storage device readable by machine, tangibly embodying a program of instructions executable by the machine to perform method steps for performing integer division, said method steps comprising:
    (a) determining an inverse of a smallest power of 2 that is larger than or equal to the known divisor to form a preliminary divisor, including storing a base 2 exponent of the smallest power of 2;
    (b) determining an inverse of a next largest power of 2;
    (c) adding the inverse of the next largest power of 2 to a cumulative divisor if a sum of the inverse of the next largest power of 2 and the cumulative divisor is less than an inverse of the known divisor, said cumulative divisor equal to a sum of the preliminary divisor and any previously determined inverses of a next largest power of 2 that were added to the cumulative divisor;

(d) storing a base 2 exponent of the next largest power of 2 if its inverse was added to the cumulative divisor in step (c);

(e) repeating steps (b) through (d) until a difference between the cumulative divisor and the inverse of the known divisor is within a preselected margin of error;

(f) storing the dividend in a register;

(g) right shifting the dividend N bits to form a cumulative quotient including storing the cumulative quotient, where N is equal to the base 2 exponent of the smallest power of 2 that is larger than or equal to the known divisor;

(h) restoring the dividend in the register and right shifting the restored dividend M bits including adding a result of shifting the restored dividend to the cumulative quotient, where M is a base 2 exponent of a power of 2 stored in step (d); and (i) repeating step (h) for each base 2 exponent of a power of 2 stored in step (d).

4. An article of manufacture comprising a computer usable medium having computer readable program code means embodied therein for performing integer division, the computer readable program code means in said article of manufacture comprising:

computer readable program code means for causing a computer to perform the steps of (a) determining an inverse of a power of 2 that is closest to the known divisor to form a preliminary divisor, including storing a base 2 exponent of the power of 2;

(b) determining an inverse of a next largest power of 2;

(c) either adding the inverse of the next largest power of 2 to a cumulative divisor if both the following conditions are met:
   i) the cumulative divisor is smaller than an inverse of the known divisor, and
   ii) a sum of the inverse of the next largest power of 2 and the cumulative divisor is closer to the inverse of the known divisor than the cumulative divisor, or subtracting the inverse of the next largest power of 2 from the cumulative divisor if both the following conditions are met:
   i) the cumulative divisor is greater than the inverse of the known divisor, and
   ii) a total of the inverse of the next largest power of 2 subtracted from the cumulative divisor is closer to the inverse of the known divisor than the cumulative divisor, said cumulative divisor equal to a total of the preliminary divisor and any previously determined inverses of a next largest power of 2 that were added to or subtracted from the cumulative divisor;

(d) storing a base 2 exponent of the next largest power of 2 if its inverse was added to or subtracted from the cumulative divisor in step (c);

(e) repeating steps (b) through (d) until a difference between the cumulative divisor and the inverse of the known divisor is within a preselected margin of error;

(f) storing the dividend in a register;

(g) right shifting the dividend N bits to form a cumulative quotient including storing the cumulative quotient, where N is equal to the base 2 exponent of the smallest power of 2 that is closest to the known divisor;

(h) restoring the dividend in the register and right shifting the restored dividend M bits including either:
   adding a result of shifting the restored dividend to the cumulative quotient if the corresponding inverse of the power of 2 was added to the cumulative divisor in step (c), or
   subtracting a result of shifting the restored dividend from the cumulative quotient if the corresponding inverse of the power of 2 was subtracted from the cumulative divisor in step (c), where M is a base 2 exponent of a power of 2 stored in step (d) and (i) repeating step (h) for each power of 2 stored in step (d).

5. A computer apparatus comprising:

means for computing and for storing an inverse of a smallest power of 2 that is larger than or equal to a preselected divisor to form a stored preliminary divisor;

means for computing and for storing a base 2 exponent of said smallest power of 2;

means for computing an inverse of a next largest power of 2;

means for storing a cumulative divisor including means for adding the inverse of the next largest power of 2 to a stored cumulative divisor if a sum of the inverse of the next largest power of 2 and the stored cumulative divisor is less than an inverse of the preselected divisor, said cumulative divisor equal to a sum of the stored preliminary divisor and any previously determined inverses of a next largest power of 2 that were added to the stored cumulative divisor;

means for computing and storing a base 2 exponent of the next largest power of 2 if its inverse was added to the stored cumulative divisor;

means for storing a preselected dividend;

means for right shifting the dividend N bits to form a cumulative quotient including means for storing the cumulative quotient, where N is equal to the base 2 exponent of said smallest power of 2; and means for restoring the dividend and for right shifting the restored dividend M bits including means for adding a result of shifting the restored dividend to the stored cumulative quotient, where M is equal to a base 2 exponent of a power of 2 stored in the means for computing and storing a base 2 exponent of the next largest power of 2.

6. The computer apparatus of claim 5 further comprising:

means for storing a plurality of copies of the preselected dividend;

means for right shifting any of said copies of the dividend by any preselected amounts to form a plurality of partial quotients, where said any preselected amounts include amounts equal to the base 2 exponent of the smallest power of 2 that is larger than or equal to the preselected divisor, and the base 2 exponent of a power of 2 stored in the means for computing and storing a base 2 exponent of the next largest power of 2; and means for selectively adding and subtracting the plurality of copies of the dividend that were right shifted by the means for right shifting.

* * * * *